United States Patent

Hosokoshiyama et al.

Patent Number: 6,039,204
Date of Patent: Mar. 21, 2000

[54] EXTRUSION-BLOW MOLDED CONTAINER HAVING CYLINDRICAL BODY AND METAL MOLD FOR PRODUCING THE SAME

[75] Inventors: Hiroshi Hosokoshiyama; Masashi Yoneyama; Makoto Busujima; Hiroaki Tokuda, all of Tokyo; Naohito Osuga, Tochigi; Kouji Tashiro, Nasu-Gun, all of Japan

[73] Assignee: Yoshino Kogyosho Co., Ltd., Tokyo, Japan

[21] Appl. No.: 09/000,161

[22] PCT Filed: May 30, 1997

[86] PCT No.: PCT/JP97/01854

§ 371 Date: Jan. 28, 1998

§ 102(e) Date: Jan. 28, 1998

[87] PCT Pub. No.: WO97/45245

PCT Pub. Date: Dec. 4, 1997

[30] Foreign Application Priority Data

May 30, 1996 [JP] Japan .................................. 8-158847

[51] Int. Cl.[7] ...................................................... B65D 1/00
[52] U.S. Cl. ........................ 220/623; 215/12.1; 215/371; 215/379
[58] Field of Search ........................... 220/623; 215/12.1, 215/371, 379

[56] References Cited

U.S. PATENT DOCUMENTS

3,434,626  3/1969  Kinslow .
3,761,550  9/1973  Seefluth .
5,269,437  12/1993  Gygax .

FOREIGN PATENT DOCUMENTS

0 182 094 A2  5/1986  European Pat. Off. .
1 464 041  12/1966  France .
4-72130  3/1992  Japan .

*Primary Examiner*—Steven Pollard
*Attorney, Agent, or Firm*—Oliff & Berridge, PLC

[57] ABSTRACT

There is provided a cylindrical extrusion-blow molded container, or a cylindrical delaminatable blow-molded container in particular, having an inner layer made of a poorly fusion-bonded resin material such as nylon, in order to improve the fusion-bond of the bottom seal section of the container, to prevent the bottom from cracking.

In a cylindrical extrusion-blow mold container, or a cylindrical delaminatable blow-molded container having an air inlet hole arranged at a neck of the container, a bottom seal section in a bottom wall of a bottom is formed with an elliptic thick and raised section arranged in and near the bottom seal section, said elliptic thick and raised section approximately showing an ellipsoid having an elliptic contour with its major axis running along a parting line.

6 Claims, 4 Drawing Sheets

EXTRUSION-BLOW MOLDED CONTAINER HAVING CYLINDRICAL BODY AND METAL MOLD FOR PRODUCING THE SAME

BACKGROUND OF THE INVENTION

This invention relates to a technology for preventing a cracked bottom of an extrusion-blow molded container having a cylindrical body.

There is proposed an extrusion-blow molded container, particularly a delaminatable blow-molded container having an air inlet hole arranged at a neck of the container. In order to prevent a bottom from cracking, such container is formed with a bottom rib in a bottom seal section. The bottom seal section includes fusion-bonded sections, each of which is provided with projections to be inserted into the other member for mutual engagement of the fusion-bonded sections (Japanese Patent Laid-Open No. 8-216238).

In the above described prior art, the bottom rib is formed in the bottom seal section of the blow-molded container by fusion-bonding a pair of fusion-bonded sections projecting from a bottom wall of the container at inner surfaces thereof. The fusion-bonded sections of the bottom rib are provided with projections and recesses alternately, so that the fusion-bonded sections may be held in mutual engagement with each other, so as to make the bottom seal section show an improved cohesive force and an enhanced strength against shearing force that can be applied in parallel with a parting line (along X–X' line in FIG. 2). With such an arrangement, the crack of the bottom of the extrusion-blow molded container having large volume is prevented.

Particularly, in the case of a delaminatable blow-molded container, such projections and recesses are very advantageous, because inner layers of the container that are typically made of a poorly adhesive resin material such as nylon can be tightly bound together due to the projections and recesses, and hence the bottom of the container is practically free from cracking.

However, containers having an elliptic cylindrical body and an elliptic bottom (hereinafter referred to as "elliptic cylindrical containers") and those having a column-shaped body and a circular bottom (hereinafter referred to as "cylindrical containers") differ significantly from each other in terms of the phenomenon of cracked bottom. In the case of the delaminatable blow-molded container having the inner layers typically made of a poorly adhesive resin material, the bottom can easily become cracked when the container is filled with liquid or accidentally dropped, if the container is a not an elliptic container but a large cylindrical container.

SUMMARY OF THE INVENTION

In view of the above identified problem, it is therefore an object of the present invention to provide a large cylindrical blow-molded container, particularly a large cylindrical delaminatable blow-molded container having the inner layers made of a poorly adhesive resin material such as nylon, in order to improve the adhesiveness of the bottom seal section of the container and to prevent the bottom from cracking.

As a result of intensive research efforts and comparative experiments on the phenomenon of cracked bottom of elliptic cylindrical containers and cylindrical containers, the inventors of the present invention found that the phenomenon of cracked bottom can appear when the bottom seal section of the blow-molded container shows a low adhesiveness due to a contraction with time of the container immediately after the blow-molding.

It is known that an extrusion-blow molded container contracts with time after the blow-molding along the parting line (in the direction of X–X' line in FIG. 2) if it is a cylindrical container, whereas the container contracts along a direction perpendicular to the parting line (in the direction of Y–Y' in FIG. 2) if it is an elliptic cylindrical container.

While the above described conventional blow-molded containers are provided with a bottom rib arranged in the bottom seal section in order to prevent the bottom from cracking, the fusion-bonded interface of the bottom rib of the container is broadened to make the bottom apt to be cracked if the container is a cylindrical container, because, unlike an elliptic cylindrical container, it contracts in a direction different from that of the parting line.

Thus, the inventors of the present invention invented that the fusion-bonded interface of the bottom of the cylindrical blow-molded container can be made to show an improved adhesiveness and prevented from cracking, if the bottom is made to contract in a direction perpendicular to that of the parting line (the direction same as the one along which an elliptic cylindrical container contracts).

As a result of the above described intensive research efforts and comparative experiments on the phenomenon of cracked bottom of elliptic cylindrical containers and cylindrical containers, the inventors of the present invention also found that a cylindrical container can be made to contract less along the parting line and effectively prevent the bottom from cracking if the bottom rib is made have a small width;

that, while the delaminatable blow-molded container having an elliptic cylindrical profile is conventionally made to have engaging sections arranged in two rows disposed one on the other in the bottom rib, the cylindrical delaminatable blow-molded container can effectively prevent the bottom from cracking when the engaging sections are arranged in a single row;

that the pins for forming the sections of the bottom rib are preferably made to show a small taper angle to make them nearly as long as the width of the rib in order to make the bottom more fusion-bondable; and that the bottom can be prevented from deforming downwardly with time when the bottom and the bottom rib are made to show an arch-like profile.

Thus, on the basis of the above findings, the object of the present invention is achieved by providing a cylindrical blow-molded container in which an elliptic thick and raised section is formed along a bottom seal section, a direction of the contraction is shifted by the elliptic thick and raised section by utilizing the contraction with time after removing the blow-molded product, so that the container may contract in a direction perpendicular to the parting line as in the case of an elliptic cylindrical container.

In order to make the effect of contraction with time more effectively, a metal mold is made of aluminum which is quickly cooled, except pinch-off sections of the mold. Additionally, a flow path of the cooling medium is located remotely from the pinch-off sections.

With this arrangement, the elliptic thick and raised section and peripheral areas of the bottom rib are made to maintain heat after the molded product is taken out of the mold, so that the elliptic thick and raised section may contracts with time.

Additionally, the object of the present invention can be achieved more effectively when the wall of the bottom seal section and the shape of the bottom rib are made to show an arch-like profile, when the bottom rib is made to show a low profile (a small length in the axial direction of the container), when the pins are made to show no stepped sections, and when the pins are made to show a small taper angle so as to make them nearly as long as the width of the rib.

Specifically, according to the invention, there is provided a cylindrical extrusion-blow mold container, or a cylindrical delaminatable blow-molded container having an air inlet hole arranged at a neck of the container, characterized in that a bottom seal section in a bottom wall of a bottom is formed with an elliptic thick and raised section arranged in and near the bottom seal section, said elliptic thick and raised section approximately showing an ellipsoid having an elliptic contour with its major axis running along a parting line. Additionally, the bottom seal section may be formed with an arch-shaped bottom rib.

Furthermore, the bottom rib of said bottom seal section may have a thickness substantially equal to or less than a thickness of the bottom wall of the seal section, fusion-bonded sections of the bottom rib may be formed with engaging sections to be forcibly pressed one into the other, and said engaging sections may be alternately arranged along a center line of the bottom rib.

According to the invention, there is also provided a metal mold for extrusion-blow molding a cylindrical container, characterized in that an elliptic thick and raised section is arranged in and near a pinch-off section along a parting line, an area in and near the elliptic thick and raised section is made of a material having low thermal conductivity, so that the elliptic thick and raised sections of the molded container can maintain heat after the container is removed out of the mold.

PREFERRED EMBODIMENT OF THE INVENTION

Figure 1:
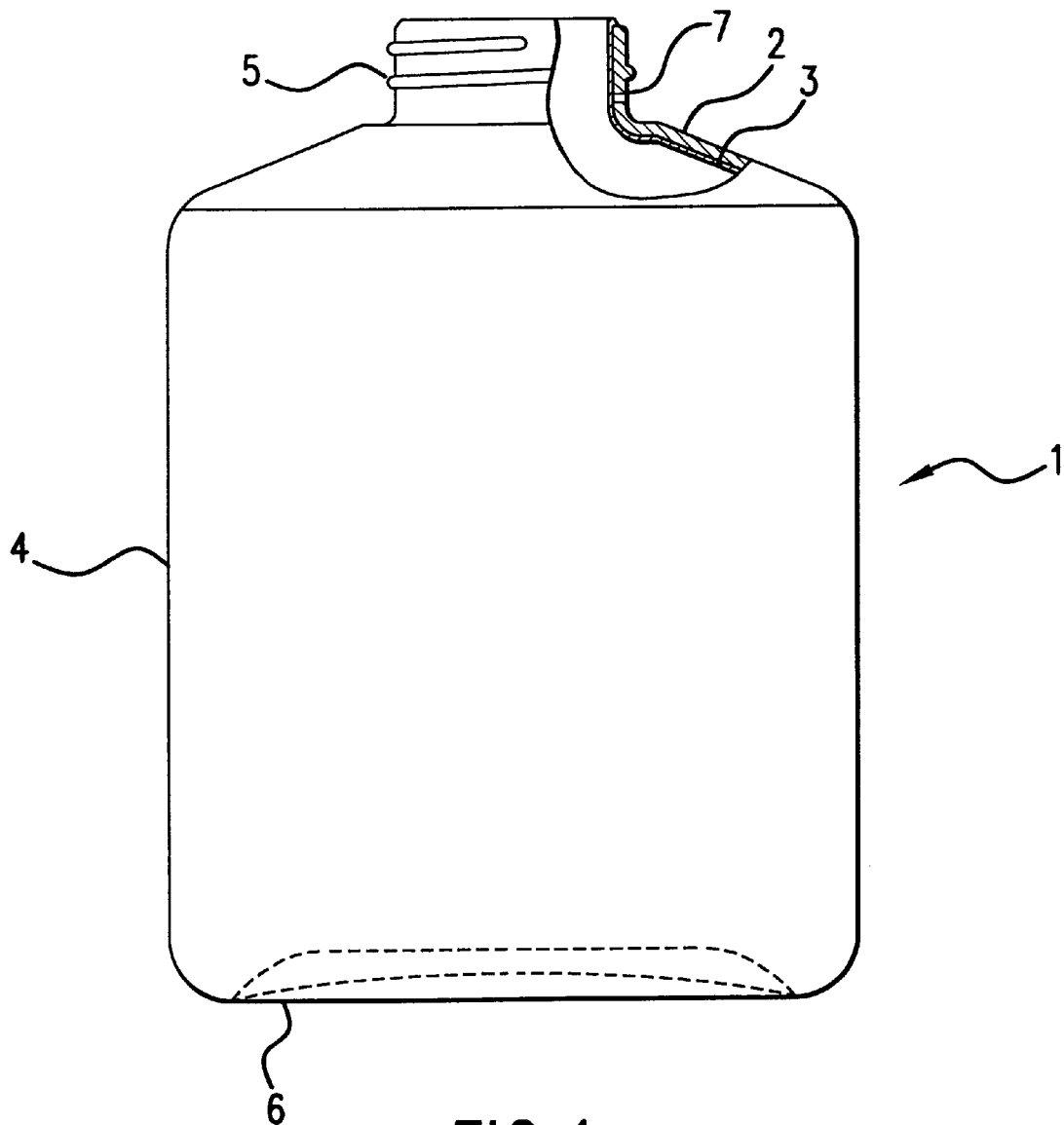
FIG. 1 is a schematic plan view of an embodiment of lamination type blow-molded container according to the invention, showing it partly in cross section.

Now, the present invention will be described in greater detail in terms of a preferred embodiment of the invention.

Firstly, the embodiment of the blow-molded delaminatable container will be described by referring to the accompanying drawings.

A container 1 illustrated in FIGS. 1 through 5 is made of a laminate comprising an outer layer 2 and an inner layer 3, and is molded by lamination-extrusion-blow-molding.

However, the present invention is not limited to a container made of a laminate or multilayer, and is applicable to a container made of a single layer body.

Said outer layer 2 may be made of any material that can maintain the appearance of the container, for example, high density polyethylene resin, although the present invention is not limited thereto. The inner layer 3 is laid or laminated on the outer layer 2, and can be delaminated or peeled off from the outer layer. The inner layer can change its shape freely, and is made of nylon and ethylenevinylalcohol copolymer (EVOH resin), although the present invention is not limited thereto.

The blow-molded delaminatable container 1 comprises a cylindrical body section 4, a neck section 5 and a bottom section 6. The outer layer 2 of the neck section 5 has an opening 7 bored through the outer layer 2 in order to introduce air between the outer layer 2 and the inner layer 3, so that the inner layer 3 is delaminated or peeled off from the outer layer 2 as air is taken in through the opening 7.

Figure 2:
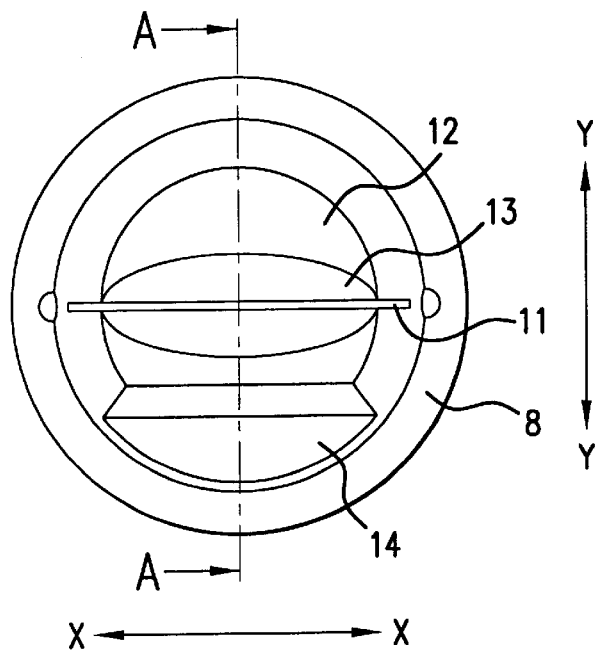
FIG. 2 is a bottom view of the blow-molded container of FIG. 1.
Figure 3:
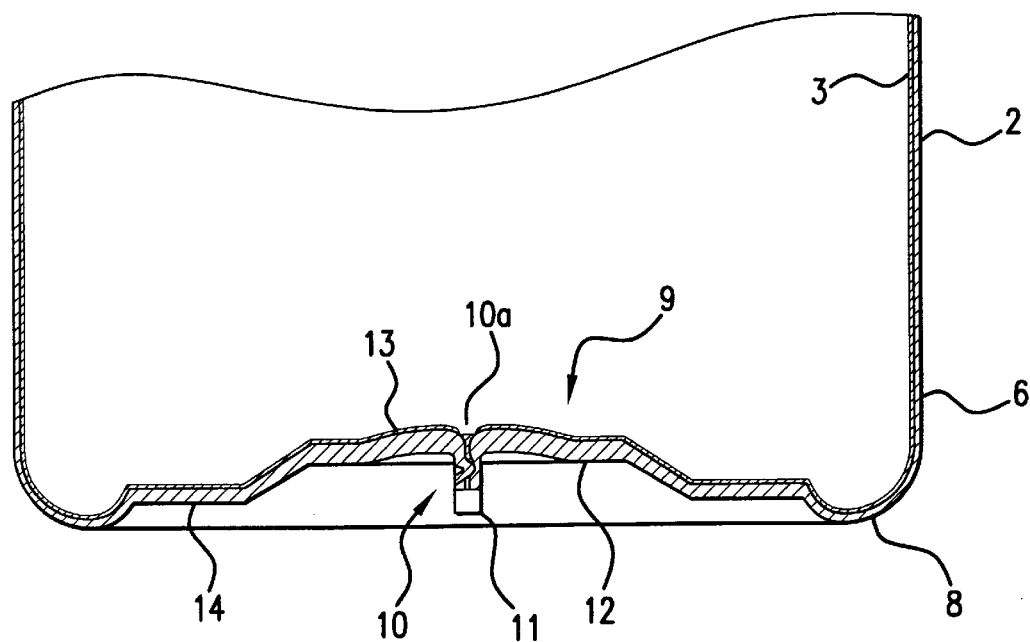
FIG. 3 is an enlarged transversal cross sectional view of the bottom of the container of FIG. 1 taking along line A–A' in FIG. 2.
Figure 4:
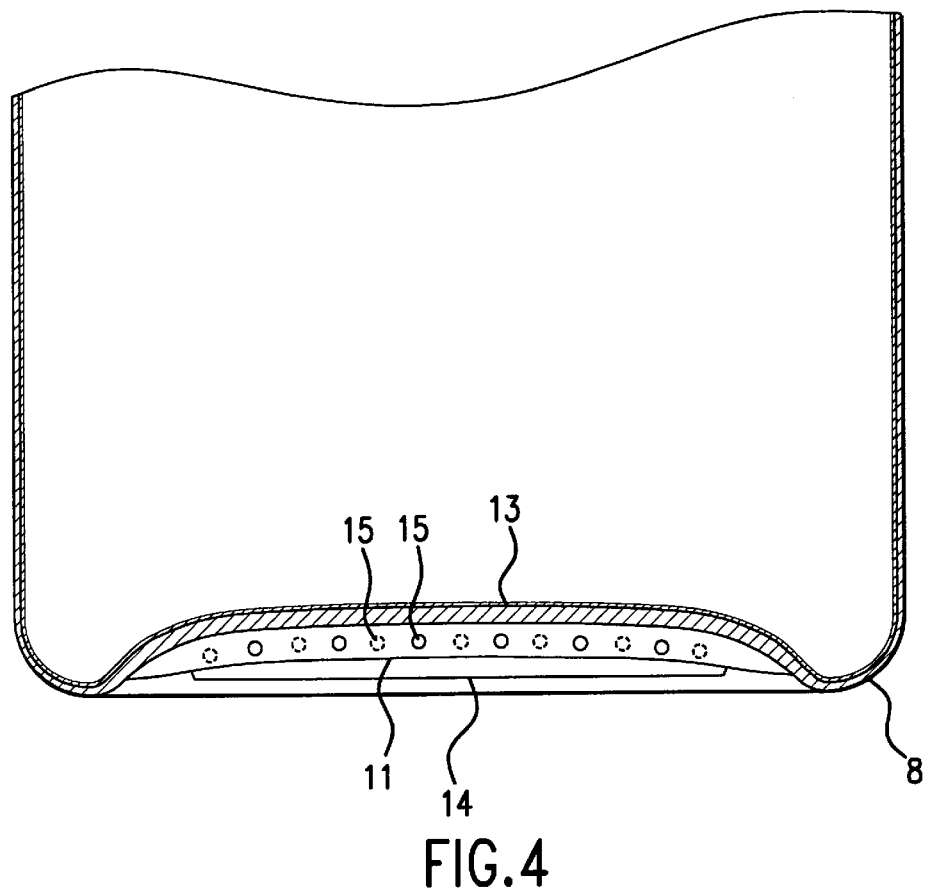
FIG. 4 is an enlarged longitudinal plan view of the bottom of the container of FIG. 1.

As shown in FIGS. 2 through 4, the bottom section 6 comprises a bottom end wall 8 arranged along an outer periphery of the container and a bottom wall 9 which is located inside the bottom end wall 8 and curved inwardly (upwardly) from the bottom end wall 8. The bottom wall 9 has a bottom seal section 10 along a parting line running through an axial center of the container. The bottom seal section 10 is provided with a bottom rib 11.

Said bottom wall 9 includes a flat wall section 12, an elliptic thick and raised section 13 and a container aligning stepped section 14. The elliptic thick and raised section 13 is formed along the bottom rib 11, and has a width increasing toward the axial center of the bottom and a level rising into an inside of the container (upwardly) also toward the axial center thereof.

Said bottom rib 11 runs through the axial center of the bottom, and is formed on the bottom wall 9 along a parting line. The bottom rib 11 is suspending outwardly (downwardly) from a lower surface of said elliptic thick and raised section 13, and its level is raised upwardly as toward the center to show an arch-like profile. The bottom rib 11 is provided with engaging sections 15 arranged along a center line of the bottom rib 11 at regular intervals. Preferably, a height (an axial dimension) of the bottom rib 11 is made small.

Figure 5:
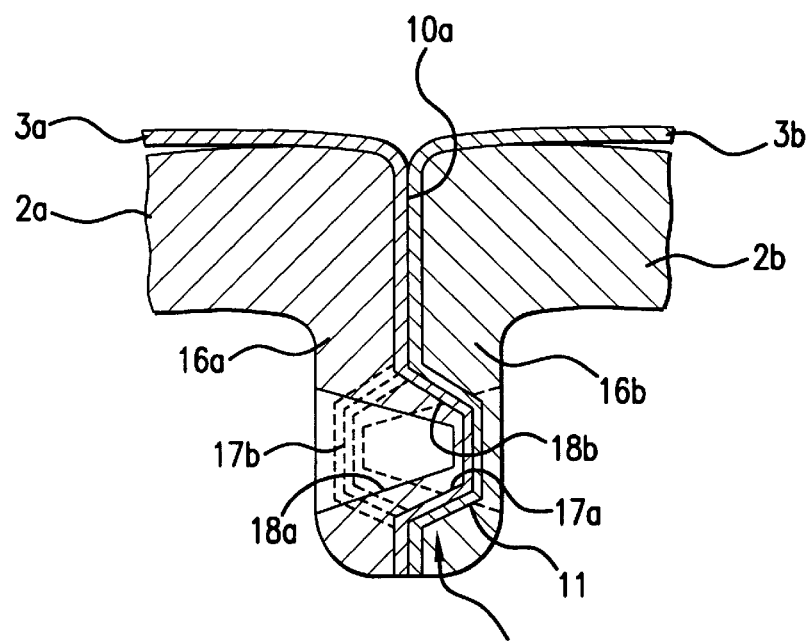
FIG. 5 is an enlarged transversal cross sectional view of the bottom seal section of the bottom of the container of FIG. 1.

As shown in FIG. 5, the bottom rib 11 of the bottom seal section 10 is formed by fusion-bonding a parison in a manner as will be described hereinafter, and fusion-bonded sections 16a, 16b are made to have respective projections 17a, 17b radially projecting from a fusion-bonded interface 10a and respective recesses 18a, 18b radially recessed. The projections and the recesses are arranged alternately. The projections 17a and the recesses 18a formed on the fusion-bonded section 16a are located vis-a-vis the corresponding recesses 18b and the corresponding projections 17b formed on the fusion-bonded section 16b. The projections 17a, 17b are forcibly pressed into and engaged with the corresponding respective recesses 18b, 18a, so that the fusion-bonded sections 16a, 16b are integrated to form the bottom rib 11, as they are fusion-bonded and engaged with each other.

In the drawings, reference symbols 2a and 2b respectively denote the outer layers of the fusion-bonded sections 16a, 16b, and reference symbols 3a and 3b respectively denote the inner layers of the fusion-bonded sections 16a, 16b.

Now, a blow metal mold for molding the above-described container will be described by referring to FIG. 6.

Figure 6:
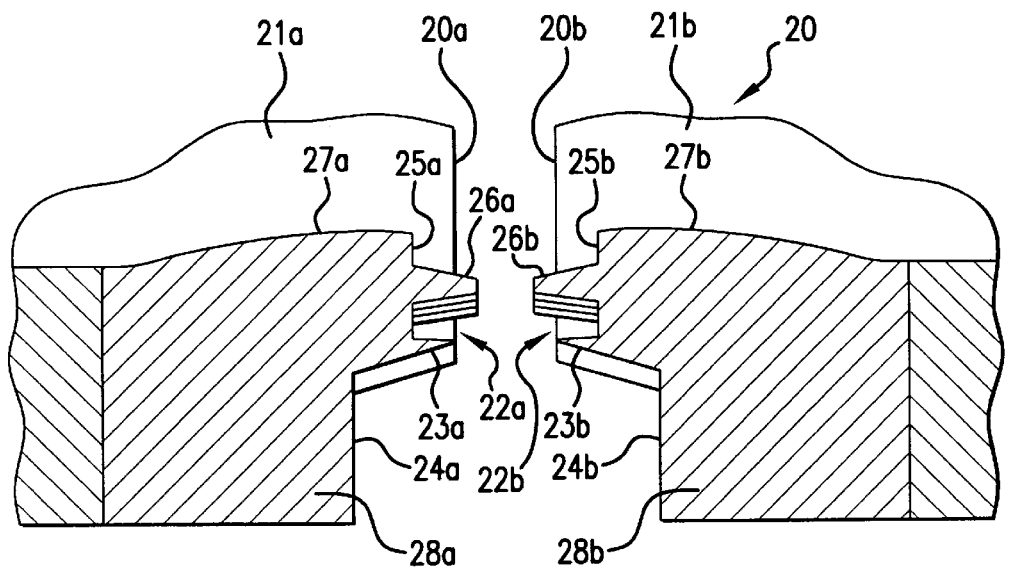
FIG. 6 is an enlarged transversal cross sectional view of the pinch-off sections of a metal mold according to the invention.

As shown in FIG. 6, a blow metal mold 20 comprises a pair of split molds 20a, 20b. Each of the split molds is formed with a cavity 21a, 21b and a pinch-off section 22a, 22b.

Said pinch-off sections 22a, 22b respectively comprise pinch-off edges 23a, 23b provided with respective lower resin escape sections 24, 24b, stepped sections 25a, 25b and pins 26a, 26b. The stepped sections 25a, 25b are located respectively on a cavity side of the pinch-off edges 23a, 23b. Additionally, the stepped sections 25a, 25b are located radially outside tips of the respective pinch-off edges along a direction perpendicular to the parting line, so as to define a thickness of the bottom rib 11, which thickness runs in a radial direction of the container. The pins 26a, 26b are projected inwardly from the respective stepped sections 25a, 25b. The pins 26a and pins 26b are arranged alternately.

The pins 26a arranged on the stepped section 25a and the pins 26b arranged on the oppositely disposed stepped section 25b are arranged alternately at regular intervals. Each of the pins 26 has a frusto-conical front end. Preferably, the front end of each of the pins 26 shows a small taper angle. The small taper angle makes the engagement deep.

The bottom rib 11 of the container is formed by said pinch-off edges 23a, 23b and the stepped sections 25a, 25b, and the engaging sections 15 (projections 17a, 17b and recesses 18a, 18b) are formed by said pins 26a, 26b.

The distance separating the pinch-off edges 23a, 23b from the respective stepped sections 25a, 25b is shorter than the height of the parison for forming the fusion-bonded sections.

The cavity 21a, 21b has a bottom wall which is provided with an elliptic raised section 27a, 27b having an elliptic contour with its major axis running along the parting line and its level rising into the inside of the container (upwardly) toward the center thereof. The pinch-off edges 23a, 23b have an arch-shaped upper surface.

The metal mold is preferably made of aluminum because aluminum can be cooled quickly. However, pinch-off peripheral sections 28a, 28b are preferably made of a material having a low thermal conductivity. A flow path (not shown) of a circulating cooling medium such as water is arranged remotely from the elliptic raised section 27a, 27b.

Parisons are placed in the metal mold in the state as shown in FIG. 6, and then the split molds 20a and 20b are tightly put together. The projections 17 and recesses 18 are formed by the pins 26. The radially and oppositely disposed walls of the parisons are fusion-bonded together as the split molds are tightly put together. The bottom rib 11 is formed by the stepped sections 25. A lower end portion of the parisons is cut off by the pinch-off edges 23. Subsequently, compressed fluid is blown into the parisons through a nozzle (not shown), so that the container is formed by blow-molding within the cavities.

The bottom wall of the container can be made thick along the parting line, because the parisons are pressed and raised upwardly by the stepped sections 25 of the pinch-off sections 22 during the blow-molding operation. The elliptic thick and raised section 13 is formed by the raised sections 27a, 27b of the metal molds.

The thin bottom rib 11 is formed by the stepped sections 25 of the pinch-off sections. The projections 17 and recesses 18 are alternately formed by the pins 26 of the pinch-off sections, to form the bottom rib 11 with rigid and secure engagement.

Since the pinch-off peripheral sections 28a, 28b are made of a material having a low thermal conductivity and the flow path is located remotely from the elliptic raised section 27a, 27b, only the areas in and near the elliptic thick and raised section 13 and the bottom rib 11 are heated sufficiently. Therefore, the areas of the elliptic thick and raised section 13 will be contracted with time in a direction perpendicular to the fusion-bonded interface.

Since the bottom seal section 10 is provided with the thick raised section 13 having the elliptic shape, the contraction with time is conducted in the direction perpendicular to the parting line.

Additionally, since the metal mold is made of thermally conductive aluminum except the pinch-off sections 22 and cooled quickly by the cooling system, the areas in and near the elliptic thick and raised section and the bottom rib are made to remain heated sufficiently after the molded product is removed from the metal mold. Thus, the contraction with time of the elliptic thick and raised section 13 along the parting line is further enhanced.

Since the bottom rib 11 has the low height or thickness, it contracts less along the parting line to increase the bonding stability of the fusion-bonded sections.

Since the elliptic thick and raised section 13 and the bottom rib 11 are formed to raise upwardly to show the arch-like profile, the central area of the bottom of the container is prevented from lowering with time.

Since the pins 26 are made to show a small taper angle to increase the projecting length of the engaging sections 15 of the bottom rib 11 from the fusion-bonded interface 10a, the bottom is more resistant to the shearing force along a direction perpendicular to the fusion-bonded interface.

Since the engaging sections are arranged into a curved single row, they are more resistive against shearing force than when they are arranged in two rows disposed one on the other.

As the above functions or effects are combined, the fusion-bonded interface is remarkably improved, so that a cylindrical delaminatable blow-molded container having a large size can be produced according to the invention.

Now, the following is a specific example of the bottom seal section of a cylindrical delaminatable blow-molded container according to the invention.

A cylindrical delaminatable blow-molded container having a volume of 500 ml was formed by extrusion blow-molding, using high density polyethylene for the outer layer and nylon for the inner layer.

The thus formed blow-molded container had a bottom diameter of about 86 mm and the fusion-bonded interface section had about 52 mm width. The elliptic thick and raised section was formed in the bottom seal section. It approximately showed an ellipsoid raised from an ellipse having a 52 mm long major axis and a 20 mm long minor axis. It had a radius of curvature of about 300 mm at the bottom surface. Its wall thickness was about 3 mm.

The bottom rib had 2 mm width, and engaging sections were arranged alternately at regular intervals of 4 mm along a curved line with a radius of curvature of 246 mm.

The recesses had a diameter of 1.4 mm at the opening and that of 0.6 mm at the bottom, and had 1.5 mm deep.

For comparison example, an elliptic cylindrical blow-molded container was formed according to Japanese Patent Laid-Open No. 8-216238. It had a flat bottom wall with a straight bottom rib that had about 3 mm width. It had engaging sections arranged in two rows disposed one on the other.

The cylindrical blow-molded container according to the invention showed a level of adhesiveness at the bottom seal section that is substantially same as that of the cylindrical blow-molded contains having a substantially same volume.

Now, a further embodiment of single layer or multilayer cylindrical extrusion-blow molded container according to the invention will be described.

This embodiment is realized by applying the construction of the bottom seal section according to the invention to a single layer or multilayer cylindrical extrusion-blow molded container.

While an ordinary single layer or multilayer blow-molded container differs from a delaminatable blow-molded container as shown in FIGS. 1 through 5 in that the former is not provided with an air inlet hole and the layers cannot be peeled off from each other, the bottom seal section of such container can be formed by an ordinary blow-molding process by using the above described metal mold.

Figure 7A:
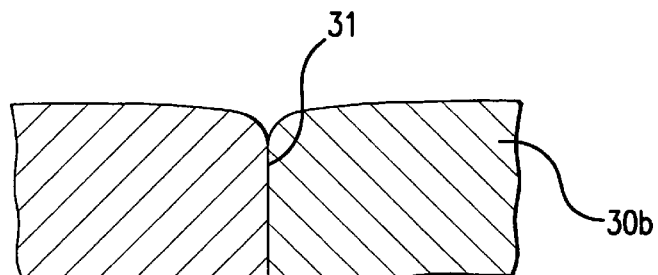
FIG. 7(a) is an enlarged transversal cross sectional view of the bottom seal section of a monolayer container.
Figure 7B:
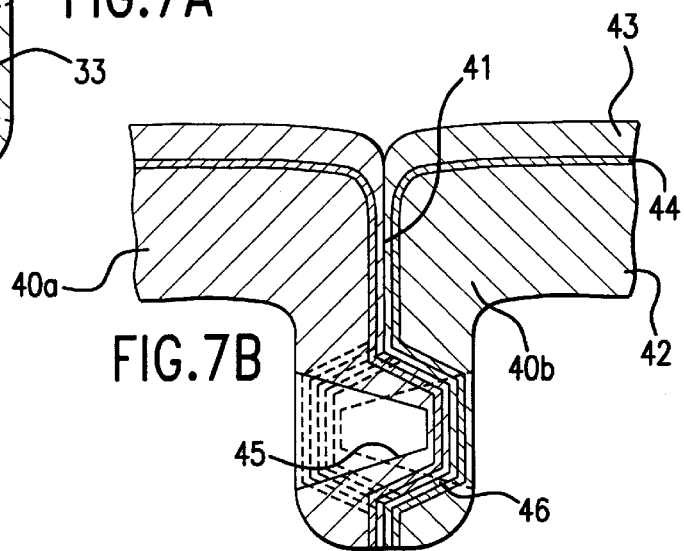
FIG. 7(b) is an enlarged transversal cross sectional view of the bottom seal section of a multilayer or lamination container.

FIG. 7(*a*) shows the bottom seal section of a single layer blow-molded container. In this Drawing, it comprises fusion-bonded sections 30*a*, 30*b*, a fusion-bonded interface 31, recesses 32 and projections 33.

According to the invention, since the bottom seal section shows an improved level of adhesiveness, the bottom is prevented from cracking even if it is made of a material such as polyethyleneterephthalate or polypropylene that is poorly fusion-bonded and that shows a poor strength when dropped, so that a large cylindrical blow-molded container can be produced.

FIG. 7(*b*) shows the bottom seal section of a multilayer or lamination blow-molded container. In this Drawing, it comprises fusion-bonded sections 40*a*, 40*b*, a fusion-bonded interface 41, outer layers 42*a*, 42*b*, inner layers 43*a*, 43*b*, an adhesive layer 44, recesses 45 and projections 46.

The outer layers 42 of a multilayer blow-molded container are typically made of a reinforcing material such as high density polyethylene or polypropylene etc., and the inner layers 43 are made of a functional material such as nylon, EvOH or polyethyleneterephthalate etc., although the present invention is not limited to these materials.

According to the invention, since the bottom seal section shows an improved level of adhesiveness, a large cylindrical blow-molded container can be produced by using such a bottom seal section even if it is made of poorly fusion-bonded resin such as nylon.

The present invention provides the following advantages.

An elliptic thick and raised section is formed along the fusion-bonded interface of the bottom seal section of a cylindrical blow-molded container, so that the contraction with time immediately after the molding operation is conducted along a direction perpendicular to the parting line. Thus, the bottom of the blow-molded container is remarkably free from cracking. Therefore, according to the invention, it is possible to form a cylindrical blow-molded container with large size.

Particularly, the present invention can advantageously be used to improve the fusion-bonding of the bottom seal section of a delaminatable blow-molded container where the inner layer is made of poorly fusion-bonded resin such as nylon. Therefore, according to the invention, it is possible to form a cylindrical container with large size.

We claim:

1. A cylindrical extrusion-blow molded container, characterized in that a bottom seal section in a bottom wall of a bottom is formed with an elliptic thick and raised section arranged in and near the bottom seal section, said elliptic thick and raised section approximately showing an ellipsoid having an elliptic contour with its major axis running along a parting line.

2. The blow-molded container according to claim 1, characterized in that the bottom seal section is formed with an arch-shaped bottom rib.

3. A cylindrical delaminatable blow-molded container having an air inlet hole arranged at a neck of the container, characterized in that a bottom seal section in a bottom wall of a bottom is formed with an elliptic thick and raised section arranged in and near the bottom seal section, said elliptic thick and raised section approximately showing an ellipsoid having an elliptic contour with its major axis running along a parting line.

4. The blow-molded container according to claim 3, characterized in that the bottom seal section is formed with an arch-shaped bottom rib.

5. The blow-molded container according to claim 2 or 4, characterized in that the bottom rib of said bottom seal section has a thickness substantially equal to or less than a thickness of the bottom wall of the seal section, fusion-bonded sections of the bottom rib are formed with engaging sections to be forcibly pressed one into the other, and said engaging sections are alternately arranged along a center line of the bottom rib.

6. A metal mold for extrusion-blow molding a cylindrical container, characterized in that an elliptic thick and raised section is arranged in and near a pinch-off section along a parting line and, an area in and near the elliptic thick and raised section is made of a material having low thermal conductivity, so that the elliptic thick and raised section of the molded container can maintain heat after the container is removed out of the mold.

* * * * *